US007305226B2

(12) United States Patent
Bui

(10) Patent No.: US 7,305,226 B2
(45) Date of Patent: Dec. 4, 2007

(54) ARCHITECTURE AND METHOD FOR INTERCEPTING COMMUNICATIONS IN A COMMUNICATIONS NETWORK

(75) Inventor: Hung Viet Bui, Chantilly, VA (US)

(73) Assignee: Nextel Communications Inc., Overland Park, KS (US)

( * ) Notice: Subject to any disclaimer, the term of this patent is extended or adjusted under 35 U.S.C. 154(b) by 0 days.

(21) Appl. No.: 11/096,621

(22) Filed: Mar. 31, 2005

(65) Prior Publication Data

US 2006/0052093 A1 Mar. 9, 2006

Related U.S. Application Data

(60) Provisional application No. 60/608,112, filed on Sep. 9, 2004.

(51) Int. Cl.
  *H04Q 7/20* (2006.01)
(52) U.S. Cl. ............... 455/403; 455/415; 455/517; 455/426.1; 455/426.2; 379/70; 379/213.01
(58) Field of Classification Search ............ 455/445, 455/426.1, 426.2, 428, 403, 415, 517; 379/70, 379/213.01, 88.13
See application file for complete search history.

(56) References Cited

U.S. PATENT DOCUMENTS 5,913,161 A * 6/1999 Ozulkulu et al. ......... 455/405

| | | | | |
|---|---|---|---|---|
| 6,405,030 B1* | 6/2002 | Suprunov | ............. | 455/410 |
| 6,470,075 B1* | 10/2002 | Prieur | ............. | 379/38 |
| 6,567,656 B1* | 5/2003 | Varinot et al. | ............. | 455/405 |
| 2002/0068582 A1* | 6/2002 | Zawislak | ............. | 455/456 |
| 2002/0071529 A1* | 6/2002 | Nelkenbaum | ............. | 379/88.13 |
| 2003/0008643 A1* | 1/2003 | Hestir | ............. | 455/417 |
| 2003/0078041 A1* | 4/2003 | Dikmen et al. | ............. | 455/433 |
| 2003/0108182 A1* | 6/2003 | Dikmen | ............. | 379/229 |

OTHER PUBLICATIONS

TR-45 Lawfully Authorized Electronic Surveillance, PN-4465-RV1, Telecommunications Industry Association, Aug. 13, 2003.

* cited by examiner

*Primary Examiner*—George Eng
*Assistant Examiner*—Huy Phan

(57) ABSTRACT

An architecture and method for intercepting communications in a communications network is disclosed. The architecture includes a first access device that captures call identifying information of a call to the communications network and transmits the captured call identifying information to a network infrastructure of the communications network over a communications channel that interconnects the first access device to the network infrastructure. The architecture also includes a second access device that resides within the network infrastructure and captures call content information of the call. The method includes the steps of capturing call identifying information of the call to the communications network by the first access device, transmitting the captured call identifying information to the network infrastructure over the communications channel, and capturing call content information of the call by the second access device.

26 Claims, 3 Drawing Sheets

ARCHITECTURE AND METHOD FOR INTERCEPTING COMMUNICATIONS IN A COMMUNICATIONS NETWORK

This application claims the benefit of U.S. Provisional Patent Application Ser. No. 60/608,112, filed Sep. 9, 2004, the entire disclosure of which is herein expressly incorporated by reference.

FIELD OF THE INVENTION

The present invention relates generally to the field of telecommunications and in particular, to intercepting communications in a communications network.

BACKGROUND OF THE INVENTION

In view of the Communications Assistance for Law Enforcement Act (CALEA), communications network operators need to provide for intercepting communications from an individual identified by a law enforcement agency and for providing the intercepted communications to the law enforcement agency. The law defines the existing statutory obligation of telecommunications carriers to assist law enforcement in executing electronic surveillance pursuant to court order or other lawful authorization and requires carriers to design or modify their systems to ensure that lawfully-authorized electronic surveillance can be performed.

FIG. 1 illustrates representative functions performed by a CALEA compliant communications network. As illustrated in FIG. 1, the functions generally include administration, access, and delivery.

The administration function 100 may be performed by an administrative data center and may include information related to a court's order for intercepting communications from a particular network user and the identity of the network user. The administrative data center sends commands to the access function 110 and delivery function 120 to manage all intercept sessions.

The access function 110 intercepts the subject network user's communication. The access function intercepts both call identifying information and call content information from the intercepted communication. Call identifying information is defined by CALEA as dialing or signaling information that identifies the origin, direction, destination, or termination of each communication generated or received by a subscriber by means of any equipment, facility, or service of a telecommunications carrier. Call content information includes any information concerning the substance, purport, or meaning of the communication. The access function provides the intercepted call identifying information and call content information to the delivery function.

The delivery function 120 delivers the intercepted information received from the access function 110 to the law enforcement agency.

One proposed architecture for complying with CALEA requirements is illustrated in FIG. 2. However, there are drawbacks with the proposed architecture. As can be seen in FIG. 2, a user communicates with communications network 200 through a communications device 210. More specifically, the communications device 210 communicates with network infrastructure 220 through base station 230. The base station 230 receives a communication from device 210 and sends the communication to network infrastructure 220 through a communications link, which is typically a T1 line 231.

In the proposed architecture, the base station 230 serves as the access function for CALEA compliancy. In performing this functionality, the base station captures both the call identifying information and the call content information of the call and provides the captured call identifying information 232 and call content information 233 to the network infrastructure over the T1 link 231. This proposed architecture has drawbacks.

When capturing the call identifying information and the call content information for CALEA purposes, the base station records this information and transports it over the T1 link to the network infrastructure. However, in addition to transporting the recorded CALEA information over the T1 link, the original information of the communication, i.e., the call identifying information 234 and call content information 235, is also transported over the same T1 link 231. Since the call content information can require significant bandwidth, particularly in broadband wireless data networks, transportation of both the original call content information 235 and the captured call content information 233 over the T1 link 231 can very quickly exhaust the bandwidth capacity of the T1 link.

Therefore, because the T1 link has limited capacity and is relatively expensive, it is not desirable for a telecommunications network to transport the captured call content information from an access function to a network infrastructure over a T1 link. Therefore, it is desirable to provide an improved architecture and method for intercepting communications in a communications network.

SUMMARY OF THE INVENTION

An architecture for intercepting communications in a communications network is provided. The architecture includes a first access device that captures call identifying information of a call to the communications network and transmits the captured call identifying information to a network infrastructure of the communications network over a communications channel that interconnects the first access device to the network infrastructure. The architecture also includes a second access device that resides within the network infrastructure and captures call content information of the call.

In accordance with a method of the present invention, the method includes the steps of capturing call identifying information of the call to the communications network by the first access device, transmitting the captured call identifying information to the network infrastructure over the communications channel, and capturing call content information of the call by the second access device.

DETAILED DESCRIPTION OF THE EXEMPLARY EMBODIMENTS

Figure 1:
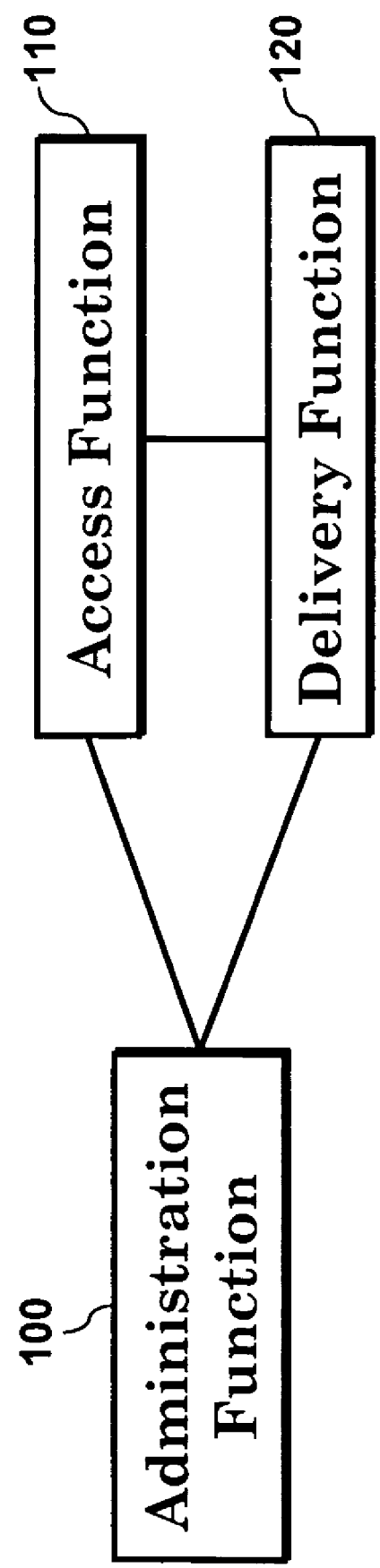
FIG. 1 illustrates representative functions performed by a CALEA compliant communications network.
Figure 2:
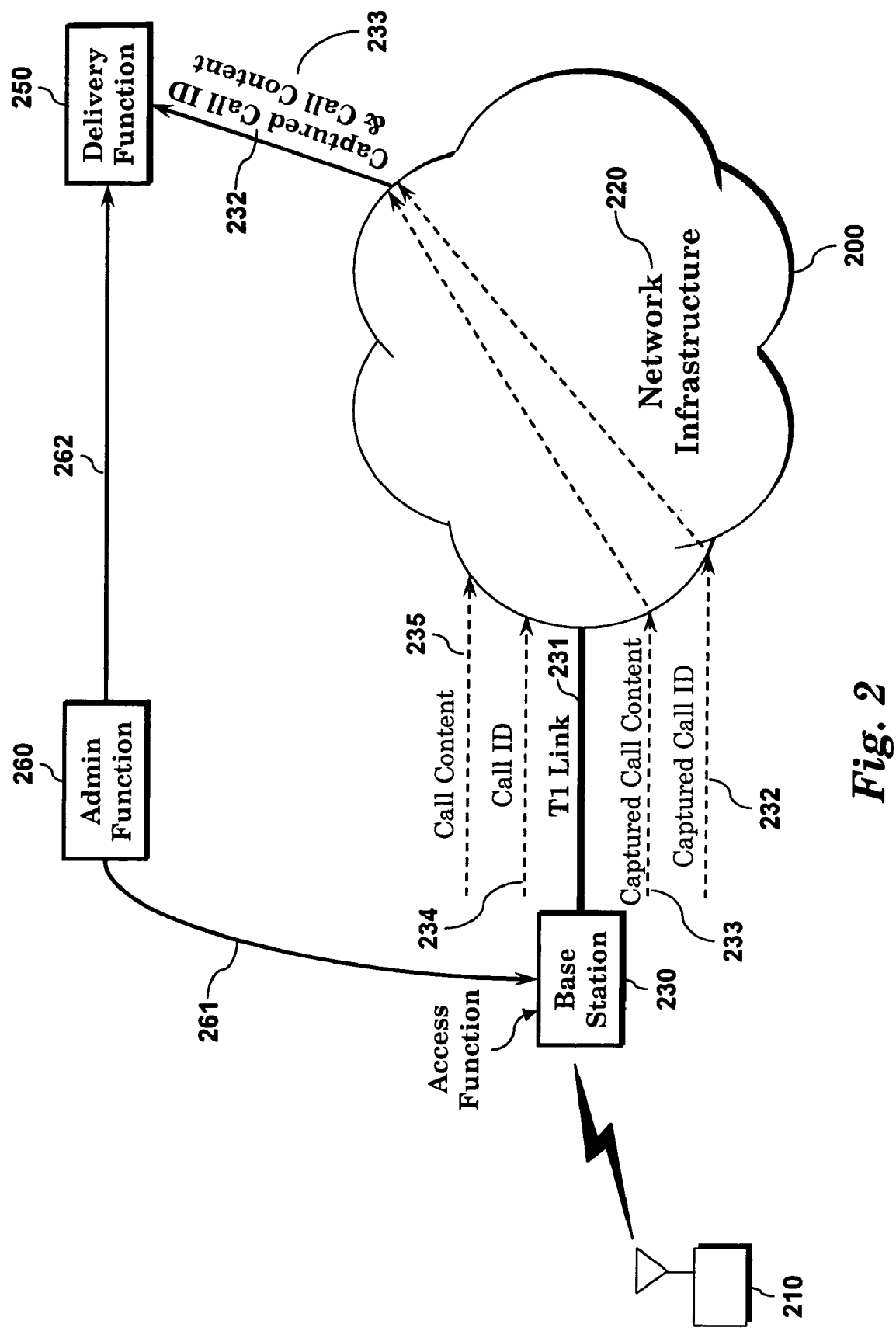
FIG. 2 illustrates an embodiment of a CALEA compliant network.
Figure 3:
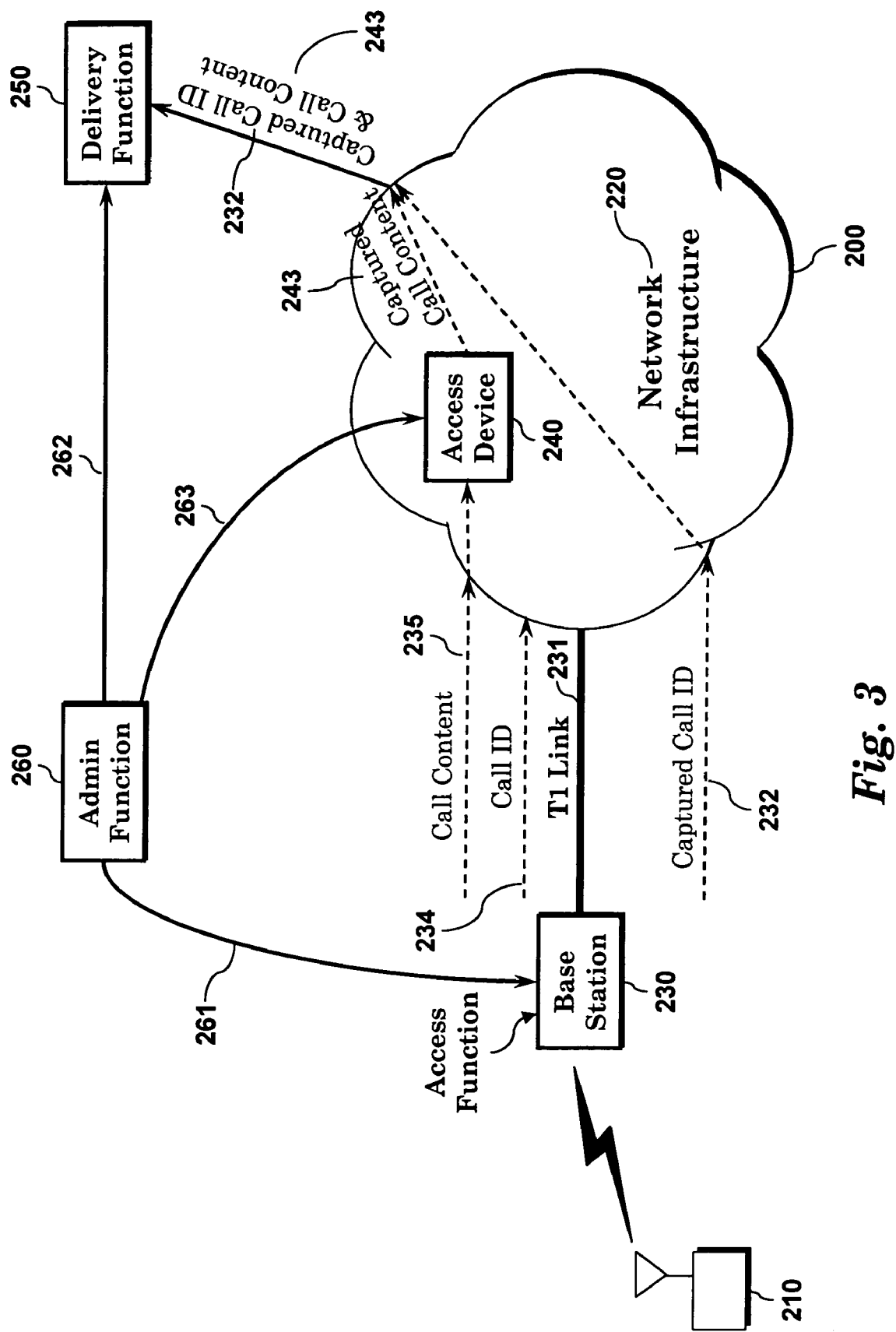
FIG. 3 illustrates a CALEA compliant communications network in accordance with the principles of the present invention.

FIG. 3 illustrates a CALEA compliant communications network architecture in accordance with the principles of the present invention. As can be seen in FIG. 3, and as discussed previously in connection with FIG. 2, a user communicates with communications network 200 through a communications device 210. The communications device 210 communicates with network infrastructure 220 through base station 230. Communications device 210 may be a telephone handset, computer, or any other device that is capable of sending information to an intended recipient. As will be discussed further below, this information may be IP packetized data or voice communications. The base station 230 receives a communication from device 210 and sends the communication to network infrastructure 220 through a communications link which is a limited bandwidth link, e.g., a T1 backhaul link 231.

In the architecture of the present invention, the base station 230 is a first access device that serves as the access function for CALEA compliancy for only the call identifying information of the communication. As will be further discussed in this specification, the architecture of the present invention also includes a second access device 240 that resides within the network infrastructure 220 for capturing the call content information of the communication for CALEA purposes. In this architecture, because the call content information is not captured by the base station 230, but rather by second access device 240 within network infrastructure 220, the limited bandwidth capacity of the T1 link is not expended for transporting captured call content information from the base station 230 to the network infrastructure. The information that is transported over the T1 link to the network infrastructure 220 includes the original call identifying information 234, the original call content information 235, and the captured call identifying information 232. Because only captured call identifying CALEA information 232 is transported over the T1 link, and because this information requires much less bandwidth than the captured call content information, the bandwidth of the expensive T1 link is much more efficiently utilized for the communications carrier. The original call content information is captured by the second access device 240 in the network infrastructure 220 for further transmission to the delivery function 250.

As discussed above, the first access device or, in this embodiment, base station 230, includes one or more intercept access points (IAPs) that unobtrusively capture call identifying information of a call from an intercept subject and transmits the captured call identifying information 232 to the network infrastructure 220 over the T1 link 231. As was also discussed previously, when capturing the call identifying information for CALEA purposes, the base station records this information and transports it over the T1 link to the network infrastructure. In this architecture, as discussed, in addition to transporting the recorded call identifying information 232 for CALEA over the T1 link, the original information of the communication, i.e., the call identifying information 234 and call content information 235, is also transported over T1 link 231 to network infrastructure 220.

As discussed above, in both of the architectures of FIG. 2 and FIG. 3, the original call identifying information 234 and call content information 235 is provided by base station 230 to network infrastructure 220 over T1 link 231. As is well known, network infrastructure 220 then provides the call content information to the party that is called by the calling party by utilizing the call identifying information. The communications device of the called party is not illustrated.

In the architectures of both FIG. 2 and FIG. 3, the captured call identifying information 232 is provided by base station 230 to network architecture 220 through T1 link 231. The captured call identifying information 232 is then provided to delivery function device 250. Delivery function device 250 is illustrated as being external to network 200, however, the present invention is not limited to any particular architecture for a delivery function device. All that is required is that captured call identifying information and captured call content information be delivered to a law enforcement agency by the telecommunications provider. The delivery function provides for this delivery of the information from the telecommunications provider. This functionality could reside within the telecommunications provider's network or be external to the network.

In providing this functionality, the delivery function may provide the intercepted communications to one or more collections functions of the law enforcement agency(s). The delivery function may deliver the intercepted communications over two distinct types of channels: call content channels (CCCs) and call data channels (CDCs). The CCCs are generally used to transport the captured call content information and the CDCs are generally used to transport the captured call identifying information, such as, as discussed previously, the calling party identity and called party identity. However, the present invention is not limited to any particular architecture for the delivery function. This functionality could be embodied in a variety of architectures and the present invention is not limited to any particular architecture for implementing this functionality.

As was also discussed above, in the architecture of FIG. 3, the original call content information 235 is captured by a second access device 240 which is resident in the network infrastructure 220. As such, the captured call content information 243 is not transmitted over the T1 link 231 and, thus, does not require bandwidth from the relatively-limited bandwidth capacity of the T1 link. As with the captured call identifying information 232, the captured call content information 243 is provided to delivery function device 250.

The present invention is not limited to any particular device for performing the functionality of second access device 240 nor is it limited to any particular architecture for provisioning the second access device(s) within the network infrastructure. The second access device 240 may be any type of device which is capable of passively monitoring the call content information, e.g., broadband wireless IP packet data and voice communication streams, to and from the intercepted target. For example, if optical fiber is utilized to transport the call content information in the telecommunications provider's network, the access devices may be a fiber optic sensor, such as a fiber tap coupler. Additionally, the second access device may be associated with any component or system within the network infrastructure, e.g., a switch or amplifier. All that is required is that the second access device be able to unobtrusively capture the call content information to and from the intercepted target as it is transported through the network infrastructure.

Also shown in FIG. 3, as well as in FIG. 2, is administration function device 260. As described previously, administration function device 260, which may be an administrative data center, provides for provisioning and maintenance of a warrant from a law enforcement agency. As such, the administrative data center sends commands 261 to the first access device 230 and commands 262 to the delivery function device 250 to manage all intercept sessions. In the embodiment of the present invention as illustrated in FIG. 3, the administrative data center also sends commands 263 to the second access device 240.

Further in the embodiment of FIG. 3, the first access device 230 sends commands to the second access device 240 to tell the second access device which target communication is to be intercepted. These commands may be an identification of the target for which communications are to be intercepted, for example, by use of the target's IP address for the particular communications device that the target is using. Depending upon the architecture of the network infrastructure, the first access device may be required to communicate with more than one access device in the network infrastructure.

The present invention can be applied to any IP-based aware Base Station (BS) device, e.g., a radio router or the like. The present invention can be used in any broadband network based on a radio access network (RAN) router based network, where the RAN router is defined as a Base Transmission Station (BTS) which terminates an IP connection from a mobile device. However, the present invention is not limited to any particular types of networks or devices. The present invention may be practiced in any of a variety of networks or devices.

For more information regarding CALEA, the interested reader can refer to Telecommunications Industry Association, TR45-PN4465-RV1, "Lawfully Authorized Electronics Surveillance", 2003, the entire content of this document is herein expressly incorporated by reference.

The disclosed embodiments are illustrative of the various ways in which the present invention may be practiced. Other embodiments can be implemented by those skilled in the art without departing from the spirit and scope of the present invention.

What is claimed is:

1. An architecture for intercepting communications in a communications network, comprising:
    a first access device wherein the first access device is located external to a network infrastructure of the communications network and wherein the first access device is a base transmission station that includes an intercept access point, wherein the base transmission station receives a communication from a user communications device where the communication includes call identifying information and call content information and wherein the intercept access point records the call identifying information of the communication from the communications device, and further wherein the first access device transmits the recorded call identifying information the call identifying information, and the call content information to the network infrastructure of the communications network over a communications channel that interconnects the first access device to the network infrastructure; and
    a second access device wherein the second access device resides within the network infrastructure and wherein the second access device captures the call content information of the communication;
    and wherein the network infrastructure provides the call content information to a party that is called by a calling party using the user communications device by utilizing the call identifying information.

2. The architecture of claim 1 wherein the communications network is a radio access network and wherein the base transmission station includes a radio access network router.

3. The architecture of claim 1 wherein the communications channel is a limited bandwidth link.

4. The architecture of claim 3 wherein the limited bandwidth link is a T1 backhaul link.

5. The architecture of claim 1 wherein the call identifying information includes calling party identification information.

6. The architecture of claim 1 wherein the call identifying information includes called party identification information.

7. The architecture of claim 1 wherein the call content information includes voice communications.

8. The architecture of claim 1 wherein the call content information includes data communications.

9. The architecture of claim 1 further comprising a delivery device and wherein the recorded call identifying information and the captured call content information is received at the delivery device.

10. The architecture of claim 1 further comprising an administrative data device coupled to the first access device and the second access device.

11. The architecture of claim 1 wherein the first access device sends information to the second access device to identify a communication from which call content information is to be captured by the second access device.

12. The architecture of claim 1 wherein the base transmission station terminates a connection from the user communications device.

13. The architecture of claim 12 wherein the connection is an IP connection.

14. A method for intercepting communications in a communications network, comprising the steps of:
    receiving a communication from a user communications device by a base transmission station located external to a network infrastructure of the communications network, wherein the base transmission station includes an intercept access point, and wherein where the communication includes call identifying information and call content information;
    recording the call identifying information of the communication by the intercept access point;
    transmitting the recorded call identifying information, the call identifying information, and the call content information to the network infrastructure of the communications network by the base transmission station over a communications channel that interconnects base transmission station to the network infrastructure;
    capturing the call content information of the communication by an access device wherein the access device resides within the network infrastructure; and
    providing the call content information to a party that is called by a calling party using the user communications device by the network infrastructure by utilizing the call identifying information.

15. The method of claim 14 wherein the communications network is a radio access network and wherein the base transmission station includes a radio access network router.

16. The method of claim 14 wherein the communications channel is a limited bandwidth link.

17. The method of claim 16 wherein the limited bandwidth link is a T1 backhaul link.

18. The method of claim 14 wherein the call identifying information includes calling party identification information.

19. The method of claim 14 wherein the call identifying information includes called party identification information.

20. The method of claim 14 wherein the call content information includes voice communications.

21. The method of claim 14 wherein the call content information includes data communications.

22. The method of claim 14 further comprising the step of receiving the recorded call identifying information and the captured call content information at a delivery device.

23. The method of claim 22 further comprising the step of sending information to the base transmission station, the access device, and the delivery device by an administrative data device.

24. The method of claim 14 further comprising the step of sending information by the base transmission station to the access device to identify a communication from which call content information is to be captured by the access device.

25. The method of claim 14 wherein the step of receiving the communication from the user communications device by the base transmission station includes the step of terminating a connection from the user communications device.

26. The method of claim 25 wherein the connection is an IP connection.

\* \* \* \* \*